United States Patent [19]

Bizzarri

[11] 4,165,848
[45] Aug. 28, 1979

[54] ROTARY THRUST DEVICE INCLUDING AXIALLY ELONGATED ROTOR ROTATABLE IN CASTING HAVING ELONGATED FLUID INTAKE AND DISCHARGE SLOTS

[76] Inventor: Alfredo Bizzarri, Via S. Donato 14/5, Firenze, Italy, I-50127

[21] Appl. No.: 819,899

[22] Filed: Jul. 28, 1977

[30] Foreign Application Priority Data

Aug. 9, 1976 [IT] Italy ............................. 9556 A/76

[51] Int. Cl.² ........................................... B64C 29/02
[52] U.S. Cl. ................................ 244/12.2; 115/52; 244/19; 244/23 C; 415/66; 416/228
[58] Field of Search ............... 244/12.2, 23 C, 9, 19, 244/2, 53 B; 115/50, 52; 416/228, 232, 236; 415/66; 180/1 P, 7 P, 7 J

[56] References Cited

U.S. PATENT DOCUMENTS

| 45,102 | 11/1864 | Welham | 415/66 |
|---|---|---|---|
| 696,666 | 4/1902 | Berg | 115/52 |
| 1,762,352 | 6/1930 | Ray | 416/232 |
| 1,828,409 | 10/1931 | Densmore | 416/228 X |
| 2,553,952 | 5/1951 | Turner | 180/7 P |
| 3,072,366 | 1/1963 | Freeland | 244/23 C |
| 3,402,897 | 9/1968 | Willems | 416/228 X |
| 3,494,575 | 2/1970 | Budworth | 244/2 |
| 3,667,704 | 6/1972 | Assmann | 244/53 B |
| 3,752,419 | 8/1973 | Richter | 244/12.2 X |
| 3,933,325 | 1/1976 | Kaelin | 244/23 C |

FOREIGN PATENT DOCUMENTS

| 2546280 | 4/1977 | Fed. Rep. of Germany | 416/228 |
|---|---|---|---|
| 371815 | 6/1939 | Italy | 180/7 P |

Primary Examiner—Barry L. Kelmachter
Attorney, Agent, or Firm—McGlew and Tuttle

[57] ABSTRACT

A fluid flow device comprises a rotor housed in a casing having slot-like intake and outlet openings. Groups of such devices can be used to form an aircraft propulsion system by drawing-in air from above through the intake openings and forcing the air downwardly through the outlet openings to provide lift and horizontal thrust, the effect being similar to that produced by the wing of a bird.

6 Claims, 13 Drawing Figures

FIG. 10 ns a core 12A, and shaped
ROTARY THRUST DEVICE INCLUDING AXIALLY ELONGATED ROTOR ROTATABLE IN CASTING HAVING ELONGATED FLUID INTAKE AND DISCHARGE SLOTS

FIELD OF THE INVENTION

The invention relates to fluid flow devices and more particularly to fluid flow devices for providing a reactive thrust to provide lift or forward movement for an aircraft, or propulsion or braking for a ground vehicle or a water vessel, and to fluid flow devices for use as pumps or compressors.

SUMMARY OF THE INVENTION

According to the present invention, there is provided a fluid flow device comprising at least one rotor and a casing for the rotor, the casing having a slot-like intake opening and a slot-like outlet opening.

BRIEF DESCRIPTION OF THE DRAWINGS

An embodiment of the invention, will now be described by way of example only, with reference to the accompanying drawings, in which.

DESCRIPTION OF THE PREFERRED EMBODIMENTS

The aircraft shown in the drawings comprises a substantially disc-like structure 1 and a central structure 3 forming the cockpit and, possibly, a housing for the propulsion units of the aircraft. The structure 1 is preferably defined by upper and lower continuous annular surfaces containing upwardly-directed suction intakes and downwardly-directed outlets. The aircraft also has vertical and horizontal rudder systems 5.

Figure 1:
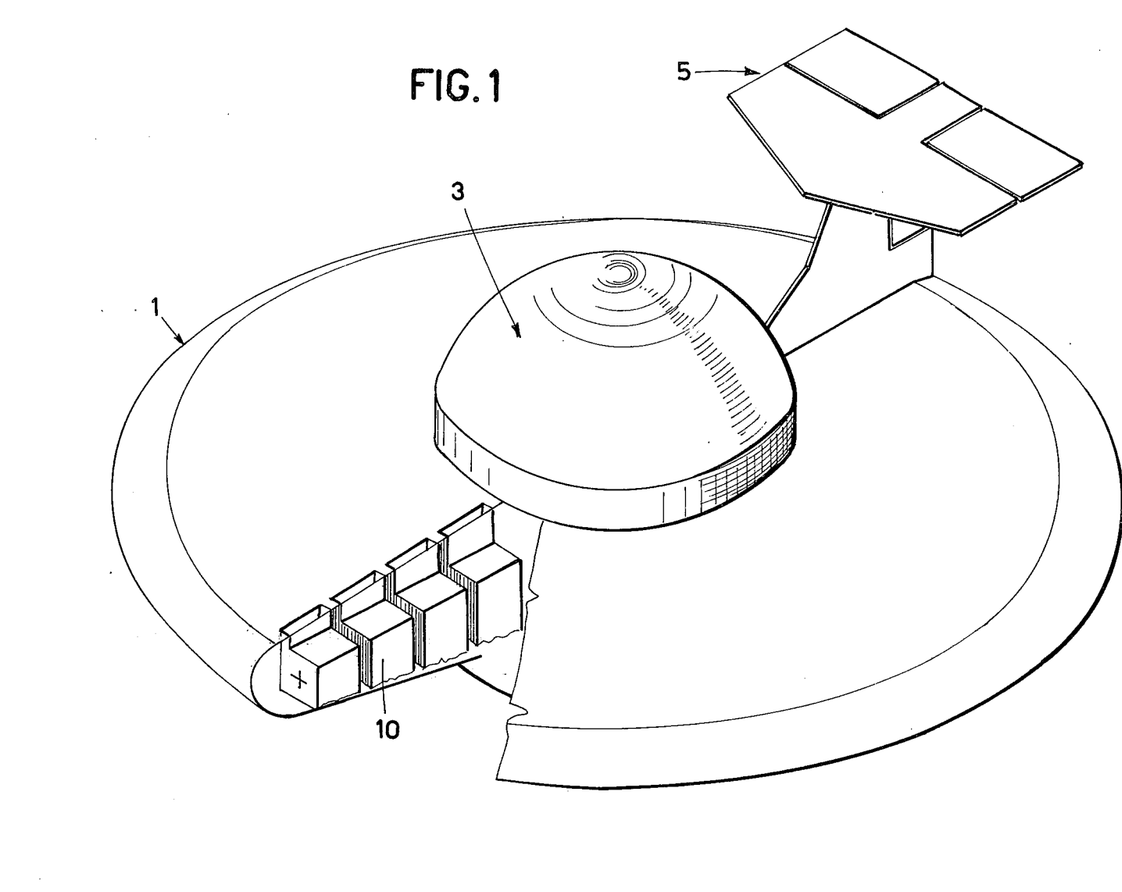
FIGS. 1 and 2 are perspective views, with parts broken away of an aircraft having a propulsion system formed by fluid flow devices in accordance with the invention.
Figure 2:
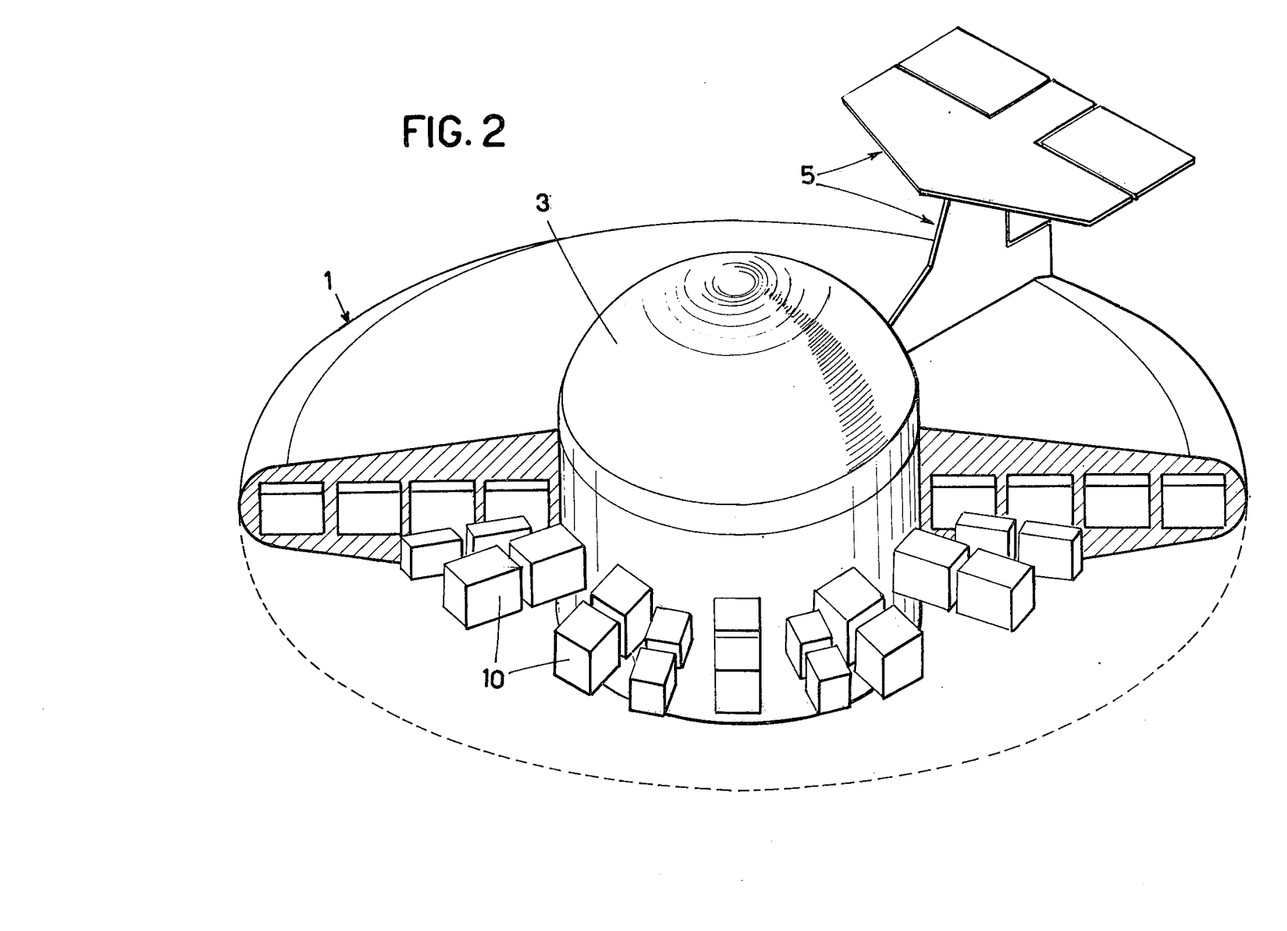
Figure 3:
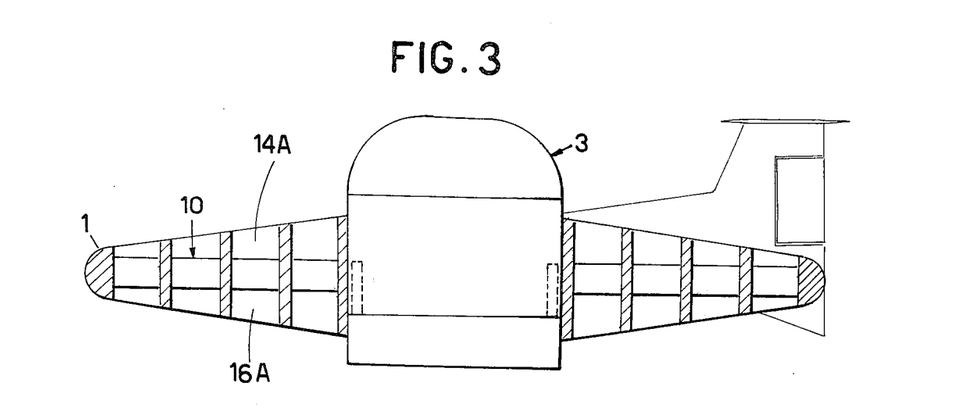
FIGS. 3 and 4 are respectively a vertical section and a horizontal section, showing the internal structure of the aircraft.
Figure 4:
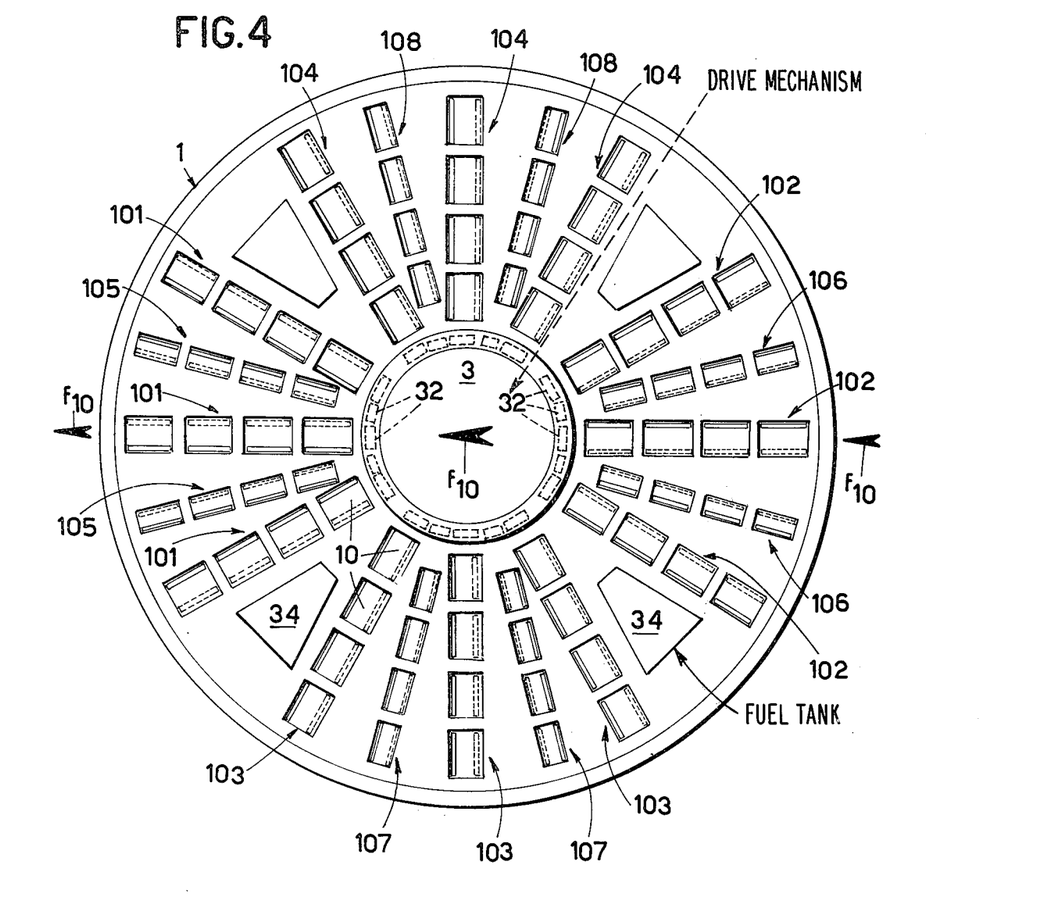
Figure 5:
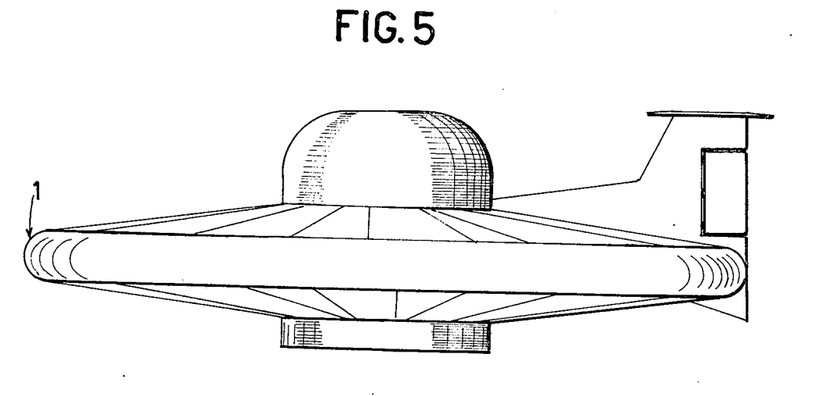
FIGS. 5 and 6 are respectively, a side elevation and a plan view of the aircraft.

There are located in the interior of the structure 1 several groups of fluid flow devices forming groups of pneumatic drive units as more particularly shown in FIGS. 2, 3 and 4. The drive units draw-in air from above and thrust the same downwardly in the form of successive impulses to simulate the effect produced by the wing of a bird during flight. The groups of drive units are radially directed, and in each group the rotors are coaxial and are coupled to be driven by means of a single drive shaft. Although the various groups of drive units have at least partly differing functions, the configuration of each drive unit is substantially the same, and one drive unit will now be described in detail.

Figure 7:
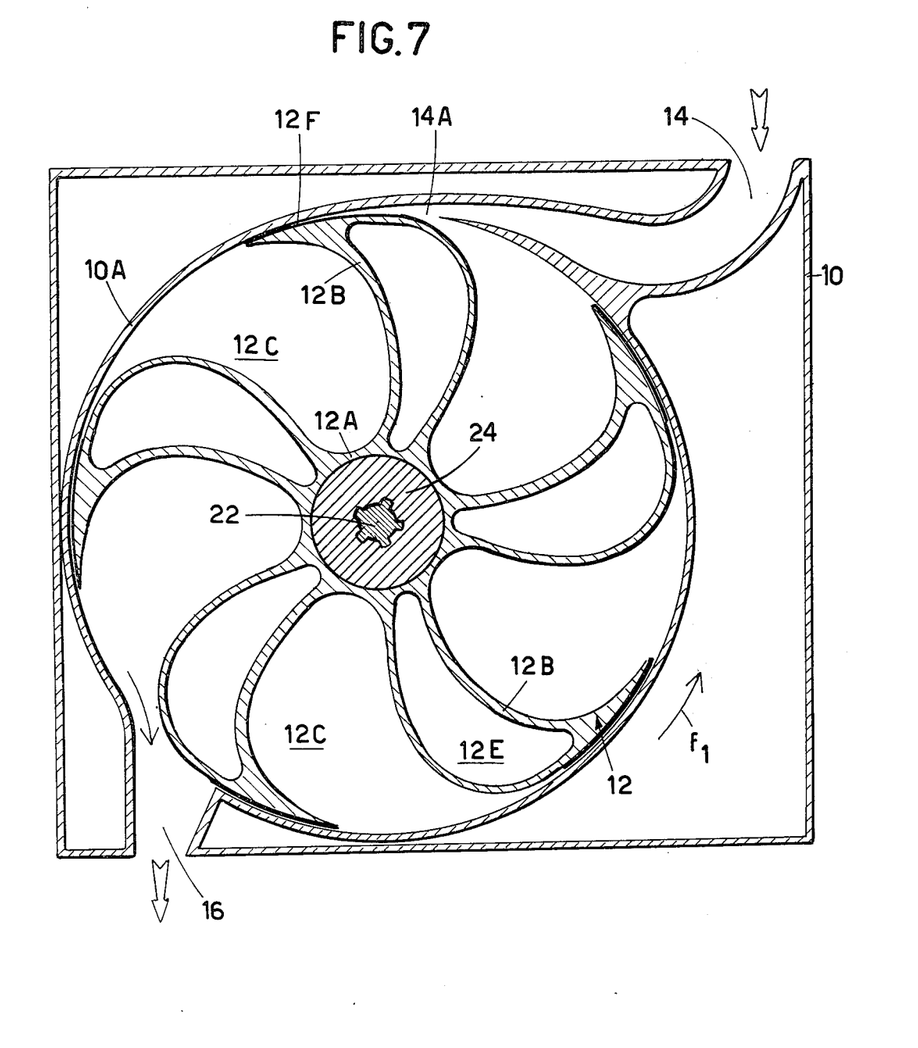
FIG. 7 is a cross-section of a pneumatic drive unit formed by a fluid flow device in accordance with the invention.
Figure 8:
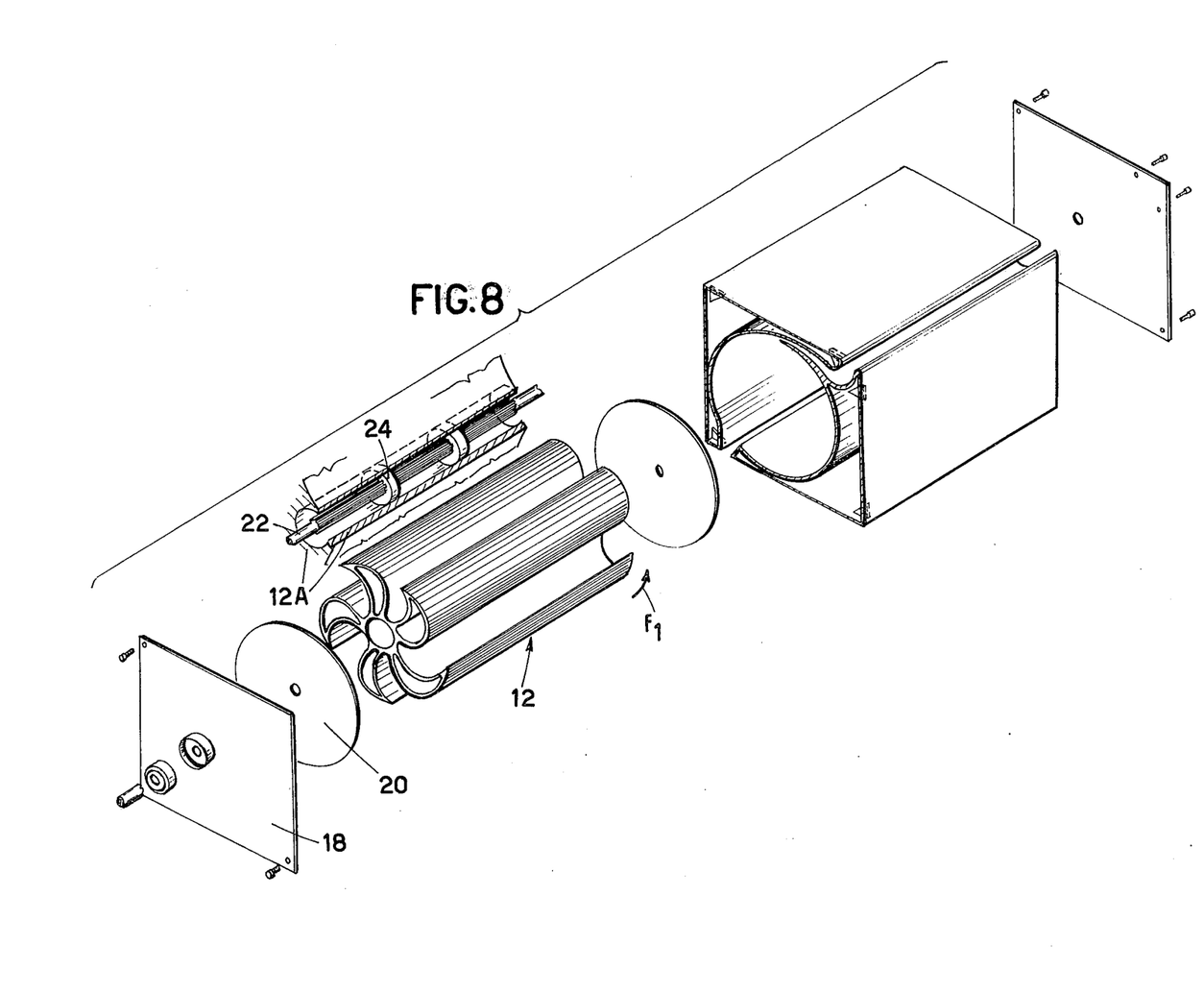
FIG. 8 is an exploded perspective view of the drive unit.
Figure 9:
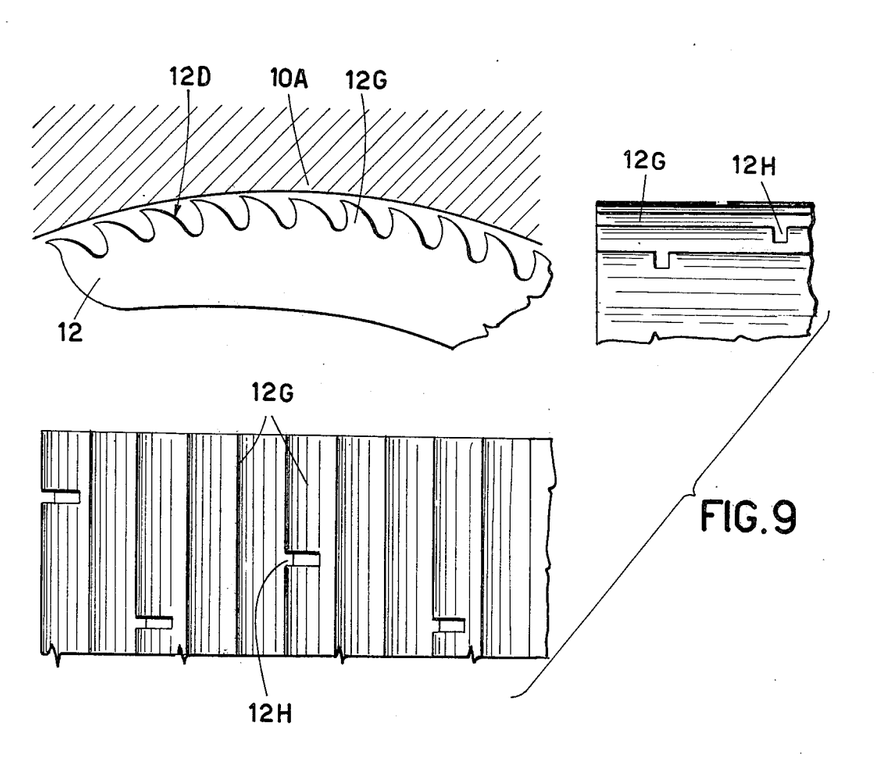
FIG. 9 shows, from three views, a sealing arrangement between a rotor and a casing of the drive unit.

In particular, with reference to FIGS. 7 and 8, 10 indicates a casing having upper and lower walls which may also be a part of the upper and lower surfaces of the structure 1. An internal wall 10A in the casing 10 defines a seat or housing of substantially cylindrical or other rotational section defined around an axis which extends horizontally in the usual attitude of flight, and radially with respect to the structure 1. The housing contains an elongate rotor 12 of a corresponding configuration. The rotor 12 includes a core 12A, and shaped vanes 12B which are separated by spaces 12C, the vanes 12B each having an internal cavity 12E for lightness. The shaped vanes 12B each have a front concave surface (with respect to the rotational direction shown by the arrow F1) and a rear convex surface, the two surfaces being connected at the periphery of the vanes by surfaces 12F of cylindrical form, with a diameter slightly less than that of the internal surface of the housing formed by the wall 10A; these surfaces 12F are shaped to provide a seal and for this purpose (see particularly FIG. 9) these surfaces 12F are toothed to provide rib-like projections 12G and channels 12D extending parallel to the rotational axis of the rotor 12. The projections 12G and the channels 12D are of aerofoil section and the projections 12G have offset transverse gaps 12H.

A shaped intake duct 14 leading from the upper wall of the casing 10 opens at 14A into the housing formed by the internal wall 10A. A duct 16 leading from the housing at a position diametrally opposed to that of the duct 14 serves for expelling air through the lower wall of the casing 10. The ducts 14 and 16 are of slot-like form in section and extend along the length of the casing 10.

The housing defined by the wall 10A is closed at its ends by walls 18 fixed to the casing 10, and the intervane spaces 12C of the rotor are closed at their ends by circular plates 20 (see FIG. 8). The walls 18 and the plates 20 are traversed by a splined shaft 22 on which are mounted splined supports 24 engaged with the core 12A, which is hollow for lightening purposes. FIGS. 2 and 3 illustrate the arrangement of the drive units in groups which extend radially of the structure 1, the drive units of each group being commonly driven. FIG. 3 more particularly illustrates how the intake slot 14A and the discharge slot 16A extend from each drive unit to the upper and lower surface, respectively, of the structure 1, for the intake of air, for example, through the intake slot 14A and the discharge of air, for example, from the discharge slot 16A to provide a downwardly directed thrust.

If the drive units are located in the structure 1 and in such a manner as to be spaced from the upper and/or lower surfaces of structure 1, the ducts 14 and 16 are provided with extensions 14AA and 16A perpendicular to the surfaces of the structure 1 (see in particular FIG. 10), or extensions 14B and 16B inclined to the surfaces of the structure for propulsive purposes (in particular see FIGS. 11 and 12); in the latter case, ailerons 26, 28 may be provided at the outer ends of the extensions 14B and 16B to modify the dynamic functions of the drive unit.

Figure 6:
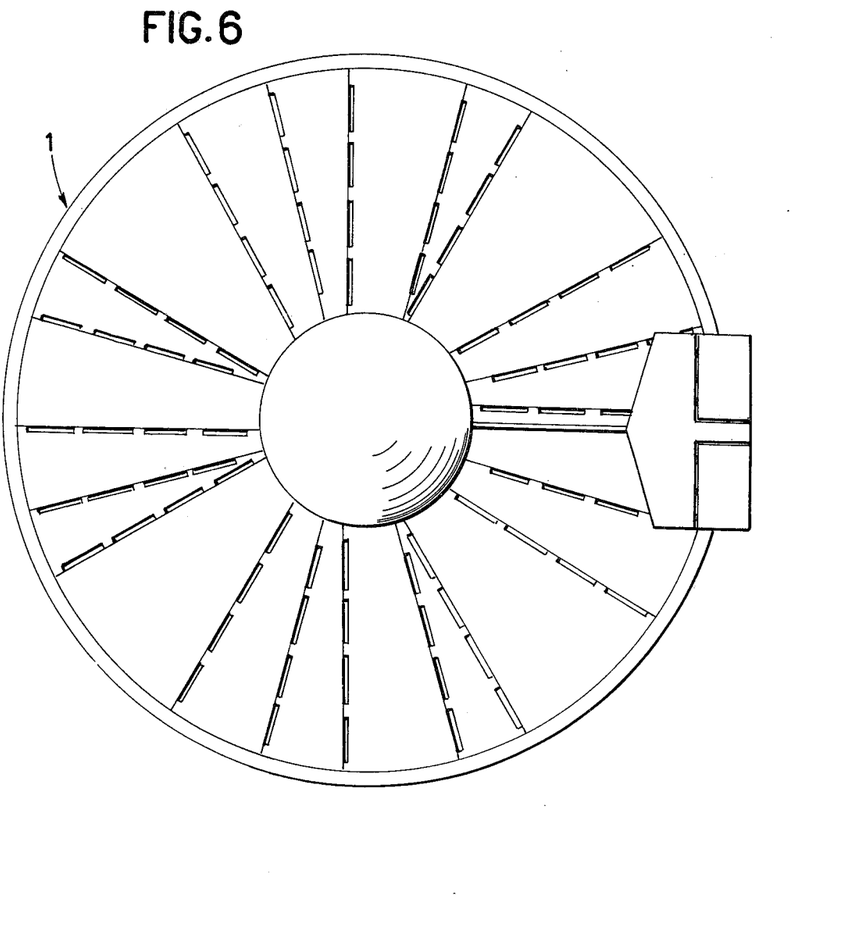

FIG. 6 illustrates the arrangement of slots which form the intake openings on the upper surface of the structure 1, the slots of each group of drive units being radially aligned, FIGS. 2 and 3 show the casings 10 of the several groups of radially-directed drive units with the rotors of each group being coaxial. Reference 32, in FIG. 4, indicates drive assemblies and/or transmission units leading from one, two, or more propulsion units housed in the structure 3 or in another part of the aircraft, and reference 34 indicates possible positions of fuel tanks.

The rotor 12 and the housing 10A which contains it comply with all the requirements necessary and sufficient for a beating wing, that is: lightness, simplicity, and a high air-intake from above with successive downwards thrusts of air. The profile of the inlet duct 14 and the size of its mouth 14A, the length of the vane outer edge, the distance between the ends of the vane edges, and the external toothing of the vane edges have been designed in such a manner as to increase the air-intake.

The toothing 12G has a dual function. The first occurs in the intake stage, when the small channels 12D of aerofoil section draw in and pick up air in the mouth 14A and thus add to the intake effect produced by the inter-vane spaces 12C. The second occurs in the compression stage, when the air collected from each inter-vane space 12C is compressed by centrifugal action against the internal surface of the housing 10A; unless otherwise blocked, this air would tend to jump over the vane edge to pass between the vane and the housing surface. The small channels 12D compel the air threads entrained therein and rotating in a clockwise direction to move towards the bottom of the channels to be urged by centrifugal action onto the following edge of the toothing. In order to prevent additional air from forming threads adhered to the internal surface of the housing 10A, owing to blocking of the air on the bottoms of the channels, the channels are provided with the transverse offset gaps 12H which allow the transfer of a little air from each channel to the next one and thus prevent the threading effect. By use of aerofoil-section toothing on the edge of the vanes 12B, there is obtained a pneumatic seal which, without the high and dangerous friction which would result from direct contact between the rotor and the housing, prevents the escape of air along the surface of the housing to a sufficient extent to allow a compression which determines the violent expulsion of the air from the duct 16, as well as a sufficient suction in each inter-vane space after its passage past the duct 16, in order to draw air from the duct 14. In this manner, a regular continuity is provided for the intake, the compression and expulsion of the air.

The drive unit as above described may be used alone, that is, as a single rotor driven by its axle or, as is more advantageous and as shown in the drawings, a group of such drive units may be arranged in a row to be driven by a single axle. In this case, a common bearing is used to support the axle between the adjacent ends of adjacent rotors.

The drive unit is intended to reproduce the effect of a beating wing and its primary use is as a drive unit for an aircraft although it does have other uses as will be discussed later. With respect to conventional aircraft which have a substantial gliding action in flight, the wings of the aircraft shown in the drawings are shortened and are extended forward and backward until they join to form a disc-shape. If the aircraft is to be maintained in flight only by the beating effect induced by the drive unit or units and the aircraft is not to have a gliding action when the beating effect stops, it would not be necessary for the upper and lower surfaces of the disc to be continuous and smooth and it would be sufficient to have an exposed structure supporting the drive unit or units. As, however, it not convenient to omit the glide, or flight combinations involving the glide, in particular in the event of a breakdown, the disc surfaces are suitably covered and smooth, as indicated in the drawings.

FIG. 4 illustrates the positions of the different groups of drive units. The groups of drive units are formed into front and rear sets, and port and starboard lateral sets. The front and rear sets 101 and 102 (with respect to the direction of motion of the aircraft as indicated by the arrow f10) have only a supporting or lifting function during flight. The sets 101 and 102 are arranged in the longitudinal axial zone of the aircraft. In order to balance the effects of the drive units of the sets 101 and 102, those of the groups of drive units which are arranged at the lateral sides of the sets 101 and 102 are provided with intake and outlet slots arranged with mirror-like symmetry and the respective groups located on the longitudinal axis of the aircraft have their slots offset with respect to the longitudinal axis and symmetrically arranged about the longitudinal axis.

The lateral sets 103 and 104 have a dual lifting and tractive function.

Groups of drive units 105 and 106 respectively are arranged between the groups forming the front and rear sets 101 and 102, for manoeuvring purposes; similarly, groups of drive units 107 and 108 for manoeuvring purposes are arranged between the groups forming the lateral sets 103 and 104.

Figure 10:
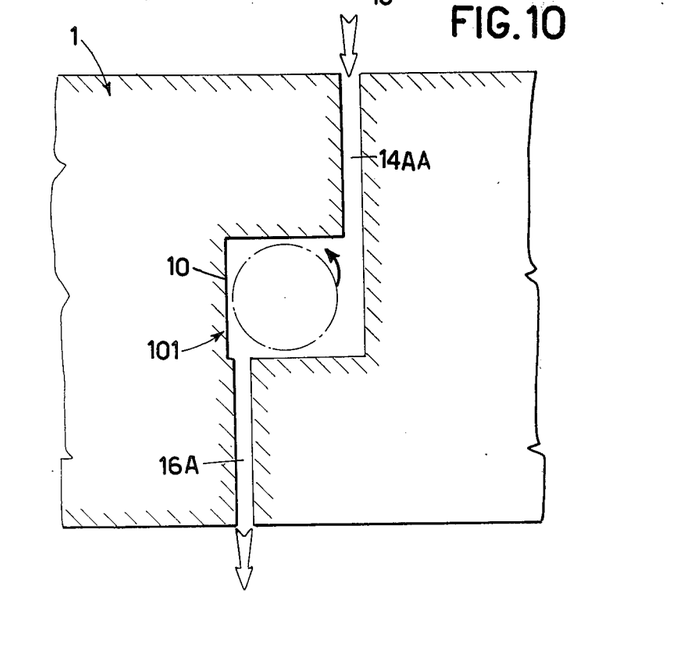
FIG. 10 is a schematic section of a drive unit for producing a lifting thrust.
Figure 11:
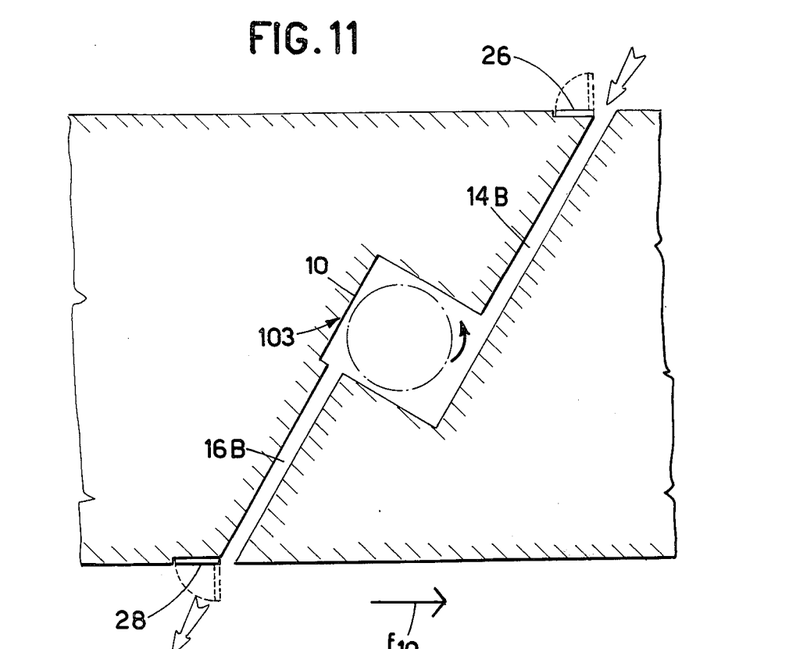
FIG. 11 is a schematic section of a drive unit for producing a lifting thrust and a horizontal thrust.

By comparing FIGS. 10 and 11, the difference between those drive units which have only a lifting function and those which have a dual lifting and tractive function will be evident. FIG. 10 shows one of the drive units for supporting or manoeuvring (in particular one of the drive units 101) in which the intake and discharge ducts 14A and 16A and the corresponding slots in the surface of the wing formed by the structure 1 are directed vertically so as to provide only a vertical thrust.

Figure 12:
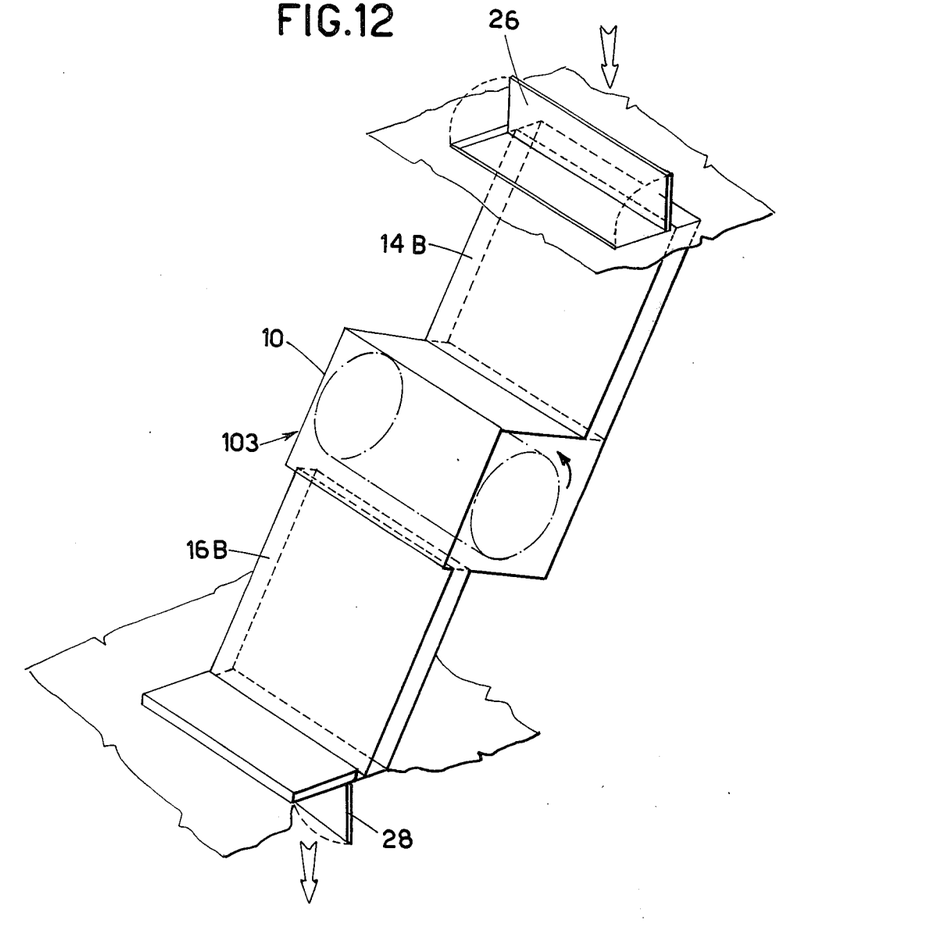
FIG. 12 is a perspective view of the drive unit shown in FIG. 11.

FIGS. 11 and 12 show one of the dual-effect drive units (in particular, one of the drive units 103) in which the intake and discharge ducts 14B and 16B are inclined to the vertical. Adjacent the rear part (in the flight direction) of the associated slots in the surface of the wing formed by the structure 1 are mounted the two ailerons 26 and 28 which are housed in the thickness of the wing behind the slots. Both ailerons are pivotal through 90° into positions in which they extend perpendicular to the wing, the aileron 26 moving in a clockwise direction, and the aileron 28 moving in a counterclockwise direction. When the two ailerons are in their inoperative positions they remain incorporated in the wing thickness and an intake and discharge occur in directions inclined to the vertical, thus providing a forward thrust, while the ailerons do not offer any drag to the air and thus do not disturb the horizontal motion of the aircraft. When the aircraft is to be moved only in a vertical direction, the ailerons are pivoted into their operative positions as shown in broken lines in FIG. 12, modifying the air intake flow direction at the outer ends of the ducts from inclined to vertical, and partly impeding the horizontal motion. The rotor casing 10 has been shown in FIGS. 11 and 12 in an oblique position merely to illustrate the dual function of the drive unit; in practice however, for ease of installation, the rotor casing will be mounted in the wing so that its walls extend vertically and horizontally, but the intake and outer ducts will still be inclined, as shown. These drive units can also be used to modify the transverse position of the aircraft.

The four sets of drive units 105, 106, 107, 108 are smaller than the other sets of drive units and serve for manoeuvring the aircraft by combining the various thrusts. The aircraft may thus be moved in any direction, be inclined, manoeuvre, and be moved vertically and laterally as desired by the pilot.

Each set of drive units is powered by a respective turbine or other engine located within the structure 3: more powerful turbines are used for the lifting and tractive drive units, and less powerful turbines for the manoeuvring drive units. For reasons of safety, it is preferred that, instead of using a single turbine for each set, two turbines of equal overall power are used, a part of the set being connected to one of the two turbines and the other part of the set being connected to the other turbine. In the event of engine failure, the aircraft will then be able to glide using the remaining working engine and the corresponding drive units.

The number, distribution, and dimensions of the drive units and of the fuel tanks 34 as shown in the drawings is only indicative of one of many possible arrangements. Experience will enable the optimum arrangements to be established.

The structure 3 also incorporates the passengers cabin and has, in its lower portion, components such as retractable wheels. As to the wheels, which are retractable inwards, there may be provided two groups, each of three wheels; a first group of large, strong supporting wheels, with small sprung movement, and a second group of lighter and smaller wheels, with a larger sprung movement. In this way, the aircraft will be also able to move on land, even on an uneven ground without losing its balance, the smaller wheels moving to meet the irregularities in the ground.

Although the fluid flow device in accordance with the invention has been described above in relation to its use as a drive unit in an aircraft propulsion system, it can also be used, singly or in series, for other purposes than that described above in order to provide a flow of air or of liquid, for example water or oil. Some examples of these other uses will now be given.

A. Supplementary thrust and braking for a motor-vehicle. One or two pairs of fluid flow devices with coaxial rotors are arranged transversely under the floor of the vehicle. One device (or one pair of devices) provides a propulsive thrust and its intake slot (or slots) is directed forwardly and its outlet slot (or slots) is directed rearwardly. The other device (or pair of devices) provides a braking thrust and its intake slot (or slots) is directed rearwardly and its outlet slots (or slots) is directed forwardly. The rotors are driven by the engine of the vehicle and the slots can be selectively opened and closed by means of appropriate controls, connected with the accelerator and the brake to provide either supplementary thrust or supplementary braking. The arrangement is such that, while keeping constant the direction of rotor rotation, by shutting off the braking device (or devices) by closing the corresponding slots and by drawing air into thrust device (or devices) from the front and urging the air rearwardly, it is possible to obtain a supplementary thrust; conversely by shutting off the traction device (or devices) and by opening the slots of the braking device (or devices) the air can be drawn in from the rear and urged forwardly to provide supplementary braking.

B. A suction and compression pump. The fluid flow device can be used together with other like devices as a pump for emptying reservoirs or channels. The possibility of using long intake/outlet slots instead of tubes as in conventional pumps, provides substantial advantages.

C. Propulsion for water vessels. The device may be used for propelling water vessels by locating sets of devices at each side of the vessel with the rotors extending perpendicular to the fore and aft axis of the vessel, so that water can be drawn in from the front and urged backwards. The conventional line of a hull, gradually narrowing to the keel, as well as towards the prow and stern, should afford a sufficient space for the application of a sufficient number of devices on both sides. The elimination of the conventional propeller with all its disadvantages, and the new propulsion system which provides a wide distribution of pulses along the hull walls, should result in smoother travel and fewer vibrations, and possibly a gain in the effective thrust provided by the engines.

Figure 13:
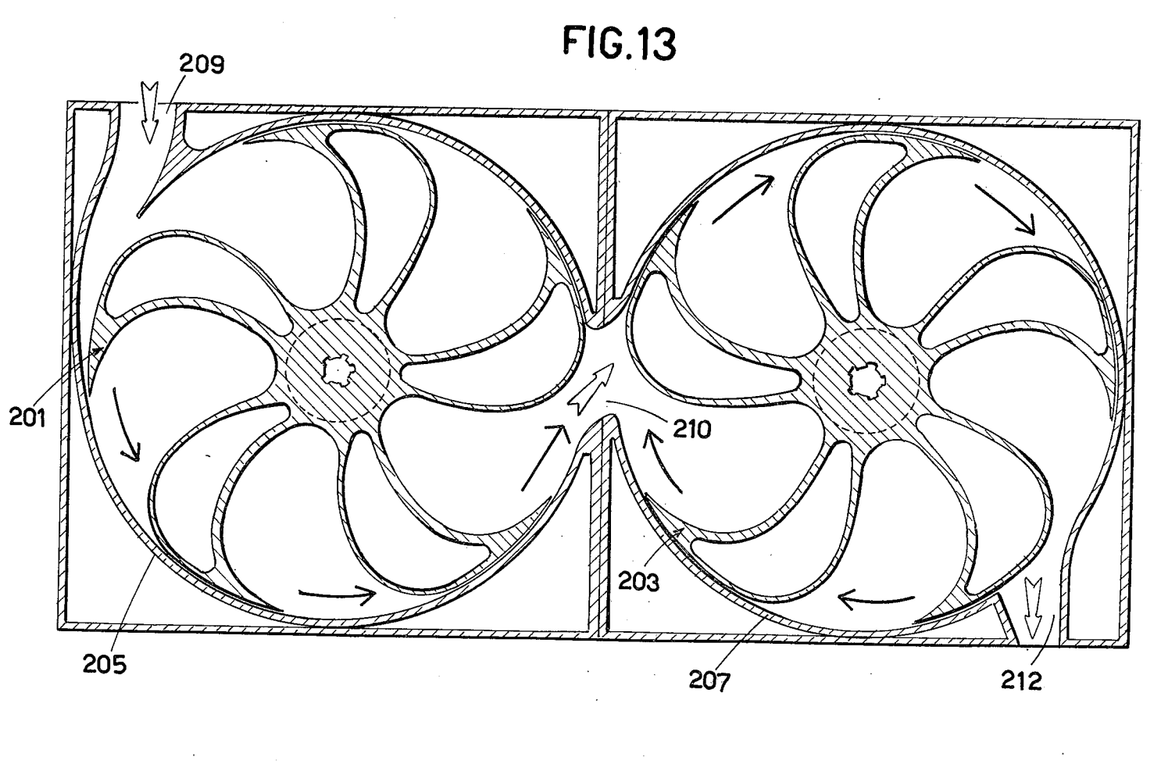
FIG. 13 is a sectional view of a drive unit comprising rotors in series.

FIG. 13 shows a power unit comprising two co-operating parallel rotors 201 and 203, operating in series, and housed in respective casings 205, 207. The casing 205 has an intake 209 and an outlet 210 which directly communicates with the second rotor 203; an outlet 212, opposite to the intake 209, serves for the outlet of the air under pressure. The two rotors 201 and 203 can be rotated in opposite directions at the same or at different speeds (in particular the second rotor at a higher speed than the first rotor), and they can have the same or different geometrical features and sizes. With two combined rotors, the first rotor draws air from outside (from the top when used to provide lift for an aircraft) and the second rotor receives from the first rotor air already under pressure and accelerated, to force it under greater pressure outwardly (downwards when used to provide lift for an aircraft).

What is claimed is:

1. A fluid flow device for propelling a vehicle comprising, in combination, a relatively elongated, substantially horizontally oriented casing having cylindrical wall means defining a horizontally oriented, axially elongated circular cross-section internal surface; an axially elongated rotor extending coaxially of said cylindrical wall means and mounted for rotation therein; longitudinally extending, peripherally spaced vanes on said rotor cooperable with said internal surface of said casing, each vane having plural longitudinal ribs on its periphery terminating adjacent to but out of contact with said internal surface of said casing, each of said ribs having an aerofoil cross-section and defining a channel between adjacent ribs and said vanes having radially concave leading surfaces considered in the direction of rotation of said rotor; said ribs cooperating with said internal surface to form a fluid seal between said vanes and said internal surface; a fluid intake slot formed in said wall means and extending longitudinally of said rotor coextensive therewith; and a fluid discharge slot formed in said wall means and extending longitudinally of said rotor coextensive therewith.

2. A fluid flow device as claimed in claim 1 and including a flap means pivotally mounted adjacent the respective fluid intake slot and fluid discharge slot for movement between operative and inoperative position whereby said flap means functions to vary the reactive forces of the fluid flowing through said slots.

3. A fluid flow device for propelling a vehicle comprising a casing having wall means defining a plurality of horizontally oriented axially elongated circular cross-section rotor chambers, said casing having a fluid intake slot and a fluid discharge slot, and one of said rotor chambers being connected into communication with said intake slot and another of said rotor chambers being in communication with said fluid discharge slot, and means for serially connecting adjacent rotor chambers into communication with one another, an axially elongated rotor rotatably mounted in each of said rotor chambers, each of said rotors extending coaxially of its respective chamber, each of said rotors including longitudinally extending peripherally spaced vanes cooperatively associated with the surfaces of its respective rotor chamber, each of said vanes of said respective rotors having a radially concave leading surface in the direction of rotation of said rotor, and each of said vanes having a curvilinear tip portion extending in the direction of rotation and terminating adjacent to but out of contact with the internal surface of its respective rotor chamber, said curvilinear tip having a plurality of longitudinally ribs projecting from the trailing outer edge of said vanes whereby said ribs are spaced slightly from said rotor chamber, each of said ribs having an airfoil cross section and defining a longitudinally extending channel between adjacent ribs, said ribs cooperating with the internal surface of the respective rotor chamber to form a fluid seal between said curvilinear vane tip and the surface of said respective rotor chamber, and said means serially connecting adjacent rotor chambers into communication being disposed so that the fluid flow therethrough causes said rotors in said adjacent chambers to rotate in opposite directions.

4. A fluid flow device as defined in claim 3 wherein each of said ribs include a gap means which are laterally offset with respect to one another so as to permit limited fluid flow between adjacent cavities defined between adjacent ones of said ribs.

5. An aircraft comprising a disc-like structure, said disc-like structure having an upper surface, and a lower surface, said upper surface having a plurality of surface fluid intake slots opening therethrough and said lower surface having a plurality of surface fluid discharge slots opening through said lower surface, a propulsion system located in said structure between said upper and lower surfaces, said propulsion system including a plurality of fluid flow devices, each of said fluid flow devices comprising a relatively elongated substantially horizontally oriented casing having cylindrical wall means defining a horizontally oriented, axially elongated circular cross-section internal surface, an axially elongated rotor extending coaxially of said cylindrical wall means and mounted for rotation therein, longitudinally extending peripherally spaced vanes on said rotor cooperable with said internal surface of said casing, each vane having plural longitudinal ribs on its periphery terminating adjacent to but out of contact with said internal surface of said casing, each of said ribs having an airfoil cross-section and said vanes having radially concave leading surfaces considered in the direction of rotation of said rotor, said ribs cooperating with said internal surface to form a fluid seal between said vanes and said internal surface, a fluid intake slot formed in said wall means and extending longitudinally of said rotor coextensive therewith, and a fluid discharge slot formed in said wall means and extending longitudinally of said rotor coextensive therewith, said fluid intake slots of said casing wall means and said fluid discharge slots of said wall means being in communication with the surface fluid intake slots of the upper surface and the discharge slots of the lower surface respectively, the rotors of said devices being driveable to draw in air through said surface intake slots and to discharge the air through said surface discharge slots to provide a downwardly directed thrust, certain of said devices providing a horizontal thrust component and all of said devices providing a vertical thrust component in a direction to provide lift to said aircraft, said fluid flow devices of said propulsion system being arranged in groups with the rotors of each group of said devices being coaxial and the common axis of the rotors of each group extending radially of said disc-like structure, the respective fluid flow devices of each group having the same function, and said fluid intake slots of said devices extending radially in said disc-like structure.

6. An aircraft as claimed in claim 5, in which said devices providing only a vertical thrust are arranged with their common axes aligned with a longitudinal center line of said aircraft, said longitudinal centerline extending in the direction of movement of said aircraft; said devices providing also a horizontal thrust component being aligned to extend transversely of said longitudinal centerline of said aircraft; said devices providing a horizontal thrust component including respective ailerons extending longitudinally of the respective fluid intake and fluid discharge slots thereof, and being operable to vary the horizontal advance thrust imparted to said aircraft and selectively to effect a change in the direction of horizontal movement of said aircraft.

* * * * *